(12) United States Patent
Cole et al.

(10) Patent No.: US 6,311,818 B1
(45) Date of Patent: Nov. 6, 2001

(54) DUAL POSITION CLUTCH RELEASE FORK

(75) Inventors: Christopher D. Cole, Ft. Wayne; Daniel V. Gochenour, Auburn, both of IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/578,022

(22) Filed: May 24, 2000

(51) Int. Cl.⁷ .................................................. F16D 13/75
(52) U.S. Cl. ........................ 192/995; 74/522; 192/110 R
(58) Field of Search ................................ 192/995, 110 R, 192/98, 85 C, 91 R, 70.13, 70.25, 89.22, 89.24, 70.29, 70.3; 74/522, 519

(56) References Cited

U.S. PATENT DOCUMENTS

| | | | |
|---|---|---|---|
| 3,800,929 | * | 4/1974 | Morris ................................ 192/99 S |
| 3,841,449 | * | 10/1974 | Coffey et al. ....................... 192/91 R |
| 4,644,812 | * | 2/1987 | Nelson ................................ 74/522 X |

* cited by examiner

Primary Examiner—Rodney H. Bonck
(74) Attorney, Agent, or Firm—Kevin M. Hinman

(57) ABSTRACT

A clutch fork assembly for use with a motor vehicle clutch includes a shaft and a fork. The shaft has an axis of fork rotation at a first location. The fork has a pair of tines and a lever arm. Each tine has a first bearing engagement point at a first bearing distance from the axis of fork rotation. The lever arm has a first linkage engagement point at a first linkage distance from the axis of fork rotation. The link engagement point is a predetermined distance from the bearing engagement point. A first clutch fork lever ratio is established by dividing the first linkage distance by the first bearing distance. The fork and shaft are configured so that, alternatively, one of the axis of rotation is selectively moveable between the first location and a second location, or the tines each have a second bearing engagement point and the lever arm has a second linkage engagement point with the distance between the second linkage engagement point and the second bearing engagement point equaling the predetermined distance.

18 Claims, 6 Drawing Sheets

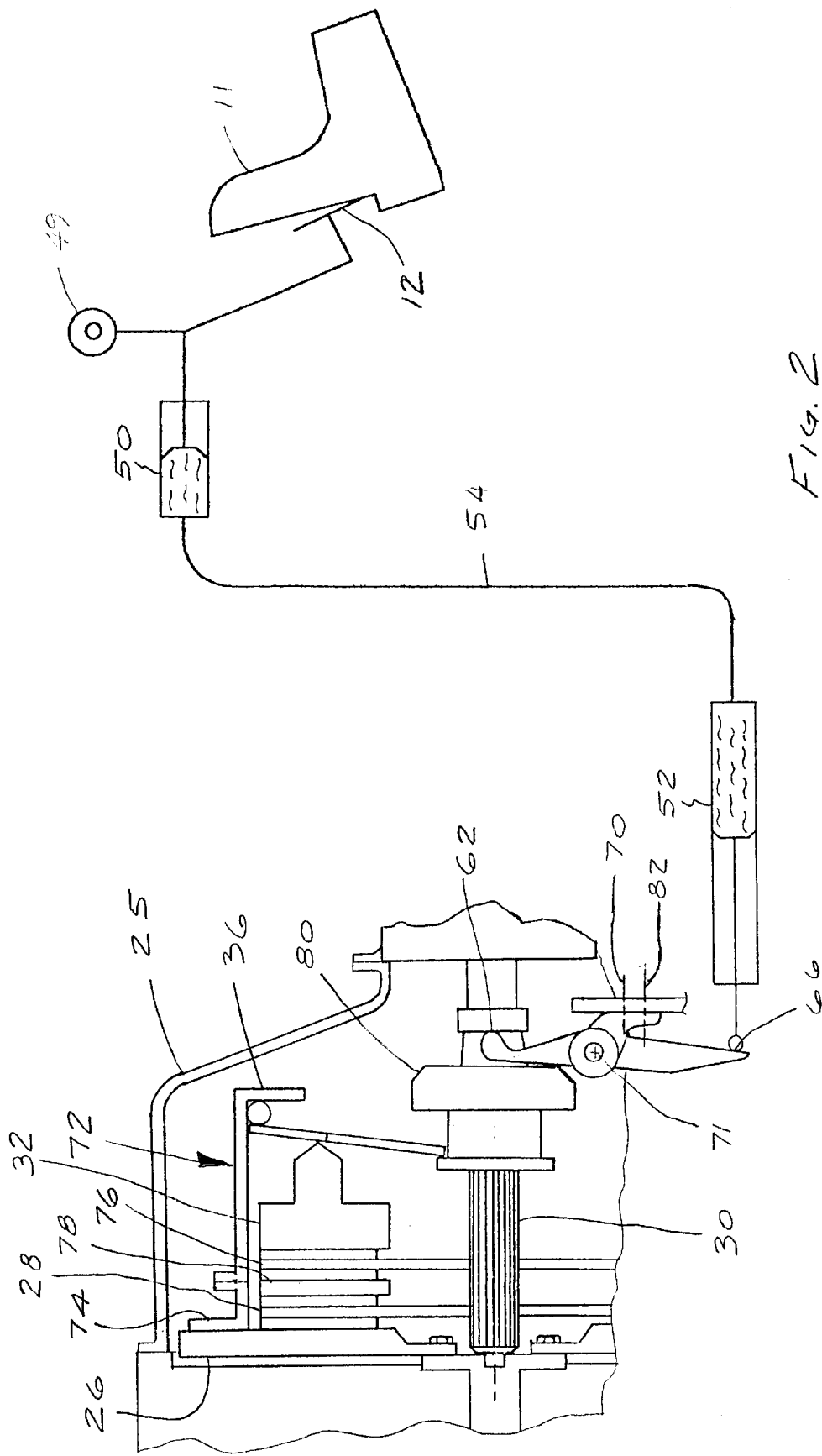

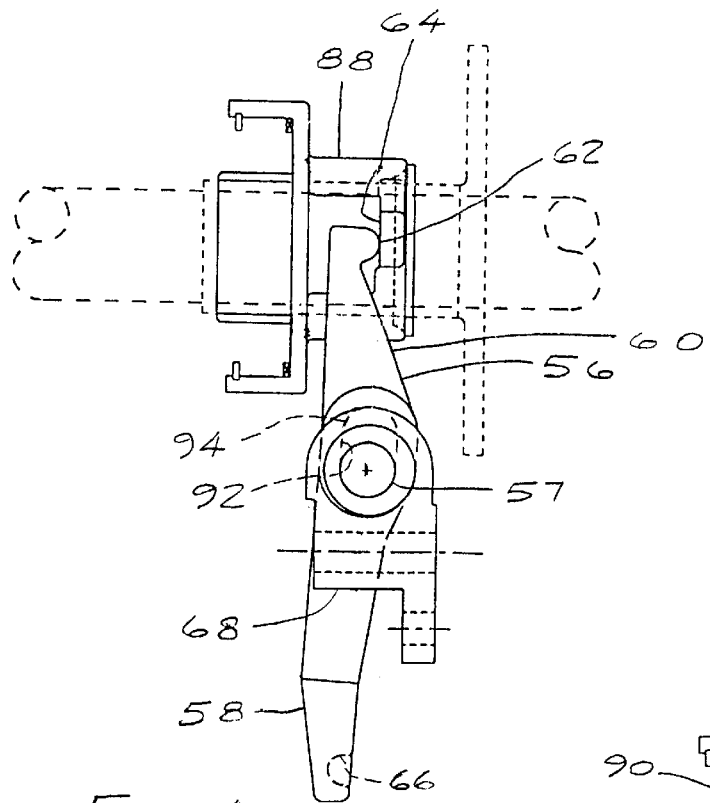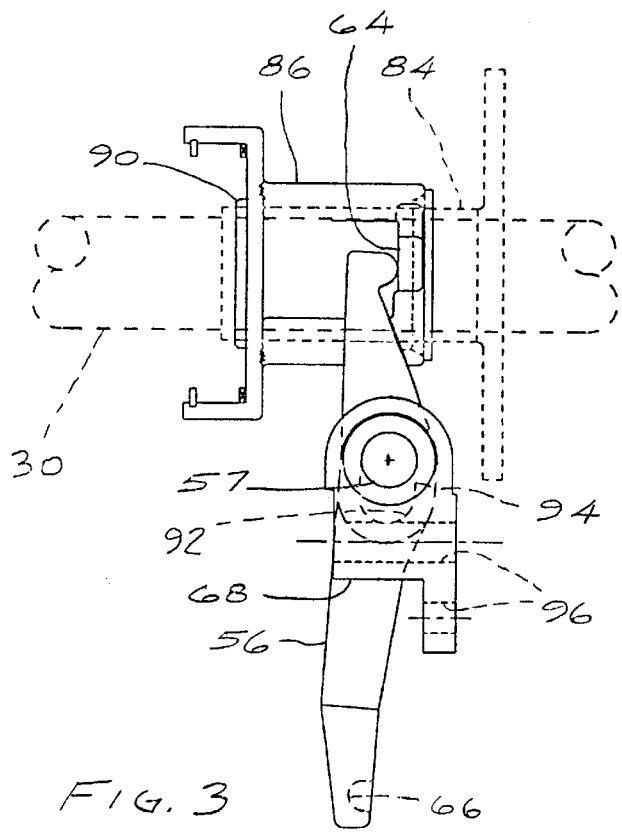

DUAL POSITION CLUTCH RELEASE FORK

FIELD OF THE INVENTION

This invention relates to the field of friction clutches, and more particularly to release mechanisms for use with friction clutches for heavy duty vehicles.

BACKGROUND OF THE INVENTION

Known friction clutches provide a releasable torsional connection between a motor vehicle engine flywheel and an associated transmission. The basic clutch structure includes a clutch cover, a pressure plate, a driven disc and a flywheel. A clutch housing encloses the clutch and connects the engine block with the transmission housing. The clutch cover is fixed to the flywheel which is in turn fixed to the engine crankshaft. The pressure plate is rotatably fixed but axially displaceable with respect to both the flywheel and the cover. The driven disc is rotatably fixed to an input shaft of the transmission by a splined connection. The driven disc is axially trapped between the flywheel and the pressure plate. The driven disc has friction facing elements on opposite sides of a radially outer disc element for engagement with the flywheel and the pressure plate. The pressure plate is axially biased toward the flywheel by one or more clutch springs to compress the driven disc therebetween, causing the driven disc to rotate as a unit with the pressure plate and flywheel.

A vehicle operator can selectively release the clutch to allow relative rotation between the input shaft and the engine by displacing a floor mounted clutch pedal with their foot. Displacement of the pedal, transmitted through a linkage, effects an axial movement of a clutch release assembly. The clutch release assembly engages the radially innermost tips of clutch levers or diaphragm spring fingers. Displacement of the tips of the levers or fingers, achieved by employing the release assembly, relieves the spring load exerted against the pressure plate.

The amount of displacement of the tips of the levers or fingers necessary to achieve a complete release of the clutch varies with the type and quantity of driven discs employed. A first amount of displacement is associated with a single disc having non-cushion facing elements. An increased amount of displacement is required when the disc has cushion facing elements. Cushion facing elements facilitate the modulation of clutch reengagement and are commonly used in passenger car clutches.

In certain heavy duty applications, two driven discs are employed in one clutch, with an intermediate plate disposed between the two driven discs.

Commonly, both a cushioned system and a dual disc system are comprised of many of the same components as the single disc non-cushioned system. The same clutch, linkage and clutch housing are used. The same flywheel and pressure plate may also be used. Such commonality makes the production of clutch systems less expensive. For a dual disc clutch to accommodate the extra thickness of the driven disc and intermediate plate, a different cover or a spacer plate is commonly employed. An additional accommodation for a dual disc clutch is the use of a shorter release assembly so that the linkage mounting location on the clutch housing does not need to be shifted.

It is also necessary to modify the clutch to compensate for the increase in axial travel of the release assembly that is required to achieve complete release when switching from a single non-cushion disc system to a single cushion disc system or to a two disc system. More axial displacement or lift of the pressure plate is required to achieve complete release of both a single cushion disc system and a two disc system than a single non-cushion disc system. The amount of axial travel needed for both a single cushion disc system and a two disc non-cushion system is about the same. Yet more displacement is required when both driven discs in a two disc clutch are of the cushioned variety. The increased axial displacement has in the past been achieved by altering the internal characteristics of the clutch so that the amount of release assembly travel can remain the same for both single disc and two disc systems. This approach allows the same linkage to be used for both single disc and two disc systems. Using a single release bearing travel distance is enabled by revising one or more internal elements of the clutch, including the cover, the diaphragm spring, or levers and/or the pressure plate to provide the necessary pressure plate displacement for the amount of release bearing travel available.

However, the use of different elements in the clutch structure is considered undesirable, as it results in a proliferation of parts for manufacturers of clutches.

It is desired to provide a mechanism which enables the use of an increased number of common components for a plurality of clutch disc configurations.

SUMMARY OF THE INVENTION

A clutch fork assembly for use with a motor vehicle clutch includes a shaft and a fork. The shaft has an axis of fork rotation at a first location. The fork has a pair of tines and a lever arm. The tines extend away from the shaft. Each tine has a first bearing engagement point at a first bearing distance from the axis of fork rotation. The lever arm extends away from the shaft and has a first linkage engagement point at a first linkage distance from the axis of fork rotation. The link engagement point is a predetermined distance from the bearing engagement point. A first clutch fork lever ratio is established by dividing the first linkage distance by the first bearing distance. The fork and shaft are configured so that, alternatively, either one of the axis of rotation is selectively moveable between the first location and a second location, or the tines each have a second bearing engagement point and the lever arm has a second linkage engagement point with the distance between the second linkage engagement point and the second bearing engagement point equaling the predetermined distance. A second linkage distance equals, respectively, one of a distance between the first linkage engagement point and the axis of rotation in the second location, and a distance between the second linkage engagement point and the axis of rotation in first location. A second bearing distance equals, respectively, one of a distance between the first bearing engagement point and the axis of rotation in the second location, and a distance between the second bearing engagement point and the axis of rotation in the first location. The ratio of the first linkage distance to the first bearing distance is selected to provide an amount of travel of a release bearing sufficient to achieve complete release of a first clutch disc configuration. A ratio of the second linkage distance to the second bearing distance is selected to provide an amount of travel of the release bearing sufficient to achieve complete release of a second clutch disc configuration.

A clutch for a motor vehicle includes a cover, a pressure plate, a pressure plate biasing spring, a release assembly, a clutch fork and a clutch fork shaft. The shaft has an axis of fork rotation at a first location. The fork has a pair of tines and a lever arm. The tines extend away from the shaft. Each tine has a first bearing engagement point at a first bearing distance from the axis of fork rotation. The lever arm extends away from the shaft and has a first linkage engagement point at a first linkage distance from the axis of fork rotation. The link engagement point is a predetermined distance from the bearing engagement point. A first clutch fork lever ratio is established by dividing the first linkage distance by the first bearing distance. The fork and shaft are configured so that, alternatively, either one of the axis of rotation is selectively moveable between the first location and a second location, or the tines each have a second bearing engagement point and the lever arm has a second linkage engagement point with the distance between the second linkage engagement point and the second bearing engagement point equaling the predetermined distance. A second linkage distance equals, respectively, one of a distance between the first linkage engagement point and the axis of rotation in the second location, and a distance between the second linkage engagement point and the axis of rotation in first location. A second bearing distance equals, respectively, one of a distance between the first bearing engagement point and the axis of rotation in the second location, and a distance between the second bearing engagement point and the axis of rotation in the first location. The ratio of the first linkage distance to the first bearing distance is selected to provide an amount of travel of a release bearing sufficient to achieve complete release of a first clutch disc configuration. A ratio of the second linkage distance to the second bearing distance is selected to provide an amount of travel of the release bearing sufficient to achieve complete release of a second clutch disc configuration.

A clutch fork assembly for use with a motor vehicle clutch includes a shaft and a fork. The shaft has an axis of fork rotation at a first location. The fork has a pair of tines and a lever arm. The tines extend away from the shaft, each tine having a first bearing engagement point at a first bearing distance from the axis of fork rotation. The lever arm extends away from the shaft and has a first linkage point at a first linkage distance from the axis of rotation. The linkage engagement point is a predetermined distance from the bearing engagement point. A first clutch lever ratio is established by dividing the first linkage distance by the first bearing distance. Means for shifting one of the axis of rotation and the engagement points relative to each other between the first distances and the second distances are provided. The distance between the engagement points and the axis of rotation may be set based on whether the clutch will be employing a first clutch disc configuration or a second clutch disc configuration.

The disclosed clutch provides a mechanism for using an increased number of common components for a plurality of clutch disc configurations.

BRIEF DESCRIPTION OF THE DRAWINGS

FIG. 3 is a side view detail of a clutch fork and a release bearing configured for a single disc clutch.

FIG. 4 is a side view of the clutch fork and release bearing of FIG. 3 configured for a two disc clutch.

DESCRIPTION OF PREFERRED EMBODIMENTS

Figure 1:
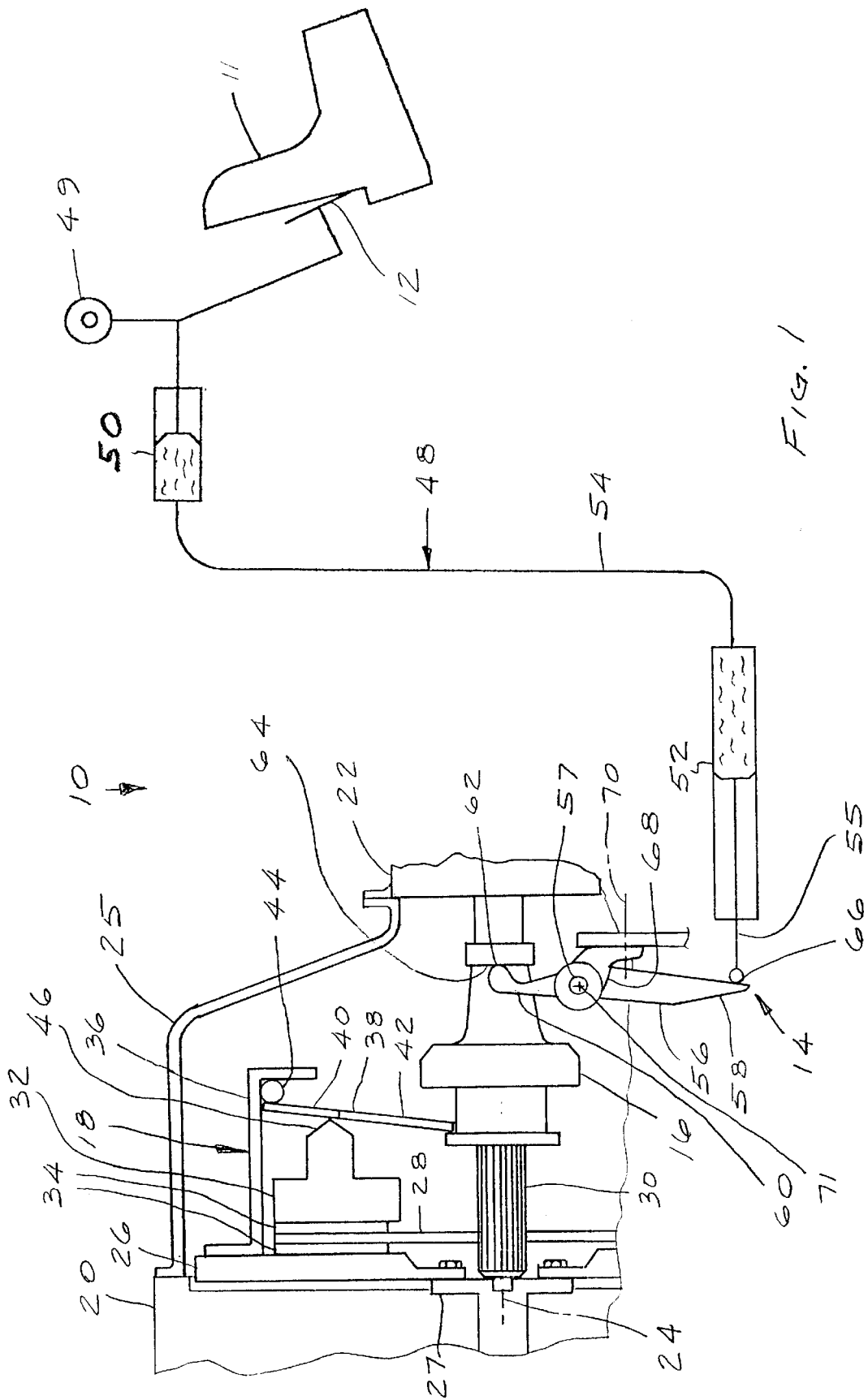
FIG. 1 is a schematic sectional side view of a clutch assembly configured for a single disc clutch.

A schematic diagram of a single disc system is shown in FIG. 1. A clutch release mechanism 10 is selectively actuated by a vehicle operator with their foot 11 using a clutch pedal 12. The motion of clutch pedal 12 is transferred through a linkage 14 to a clutch release assembly 16. A single disc frictional clutch 18 drivingly connects an engine 20 with a transmission 22. Clutch 18 rotates about an axis 24. A clutch housing 25, also referred to as a bell housing, rigidly connects an engine block of engine 20 with a housing of transmission 22. A flywheel 26 is rotatably fixed to a crankshaft 27 of engine 20. A driven disc 28, centered with respect to axis 24, has a splined hub portion which slidably engages a splined input shaft 30 of transmission 22. Driven disc 28 is sandwiched between flywheel 26 and a pressure plate 32. Driven disc 28 has non-cushion friction elements 34 which are engaged by flywheel 26 and pressure plate 32 when clutch 18 is in an engaged condition.

A cover 36 is disposed over pressure plate 32 and is fixed to flywheel 26. A plurality of straps (not shown) circumferentially extend between pressure plate 32 and cover 36. The straps rotatably fix pressure plate 32 to cover 36 while allowing relative axial displacement of pressure plate 32 to cover 36. The straps are configured to serve as springs which bias pressure plate 32 away from flywheel 26.

A diaphragm spring 38 is axially disposed between cover 36 and pressure plate 32. An annular portion 40 of diaphragm spring 38 biases pressure plate 32 toward flywheel 26, clamping driven disc 28 between flywheel 26 and pressure plate 32 to rotatably connect or lock input shaft 30 with flywheel 26 when clutch 10 is in an engaged position. Diaphragm spring 38 has a plurality of radially extending fingers 42, the radially inner tips of which are engaged by the axially displaceable release assembly 16. Release assembly 16 is slidably disposed over input shaft 30. Release assembly may be disposed directly over input shaft 30 or on a quill surrounding input shaft 30. A pivot ring 44, or other pivot feature such as a bead formed in the cover, is axially disposed between an outer diameter of annular portion 40 and cover 36. Ring 44 facilitates the pivoting or flexing of annular portion 40 relative to cover 36.

Clutch 18 is selectively released or disengaged by axially displacing release assembly 16 along axis 24 in a direction away from flywheel 26 against the force of diaphragm spring 38. Such displacement is achieved by a vehicle operator depressing pedal 12, with the motion of the pedal being transferred through linkage 14 to displace release assembly 16. As the radially inner tips of fingers 42 are axially displaced away from flywheel 26, fingers 42 bow, causing annular portion 40 to deflect, thereby relieving the clamping load against pressure plate 32, and permitting rotation of input shaft 28 relative to flywheel 26. Annular portion 40 engages fulcrum 46 of pressure plate 32 proximate to an inner diameter of annular portion 40.

The illustrated linkage 14 includes a hydraulic linkage 48 having a master cylinder 50 operated by a push rod extending from clutch pedal 12. Pedal 12 rotates about pivot 49. Master cylinder 50 is fluidly connected with a slave cylinder 52 by a hydraulic line 54. Fluid displaced from master cylinder 50 with the displacement of pedal 12 displaces a piston in slave cylinder 52. A push rod 55 connected to the piston in slave cylinder 52 engages clutch release fork assembly 56, and causes it to pivot against clutch release assembly 16. Release fork assembly 56 includes a release shaft 57, and a fork having a lever arm 58 and a pair of parallel tines 60. Tines 60 each have a bearing engagement point 62, defined by a convex engagement surface, or a roller, which engage release assembly pad 64 disposed on either side of release assembly 16. A line between pads 64 intersects, or is proximate to, axis 24 so as to minimize any tilting of release assembly 16, by tines 60. Lever arm 58 has a linkage engagement point 66, defined by a pocket or other feature, which receives an end of push rod 55. Release shaft 57 is supported on each end by a shaft support 68. In a exemplary embodiment of FIG. 1, shaft support 68 is a bearing mounted to clutch housing 25 at a first shaft support mounting point 70.

It should be appreciated that alternative actuation means may be substituted for hydraulic linkage 48. Alternatives include a cable system, a rigid mechanical linkage comprising bell cranks and connecting rods, and electric motor driven mechanisms.

Release shaft 57 has a fork pivot axis 71 about which fork assembly 56 pivots. In this embodiment, fork pivot axis 71 is coincident with an axis defined by pivot bearings 68. A first linkage distance equals the distance between axis 71 and linkage engagement point 66. A first bearing distance equals the distance between axis 71 and bearing engagement point 62. A first clutch fork lever ratio equals the first linkage distance divided by the first bearing distance.

Figure 2:
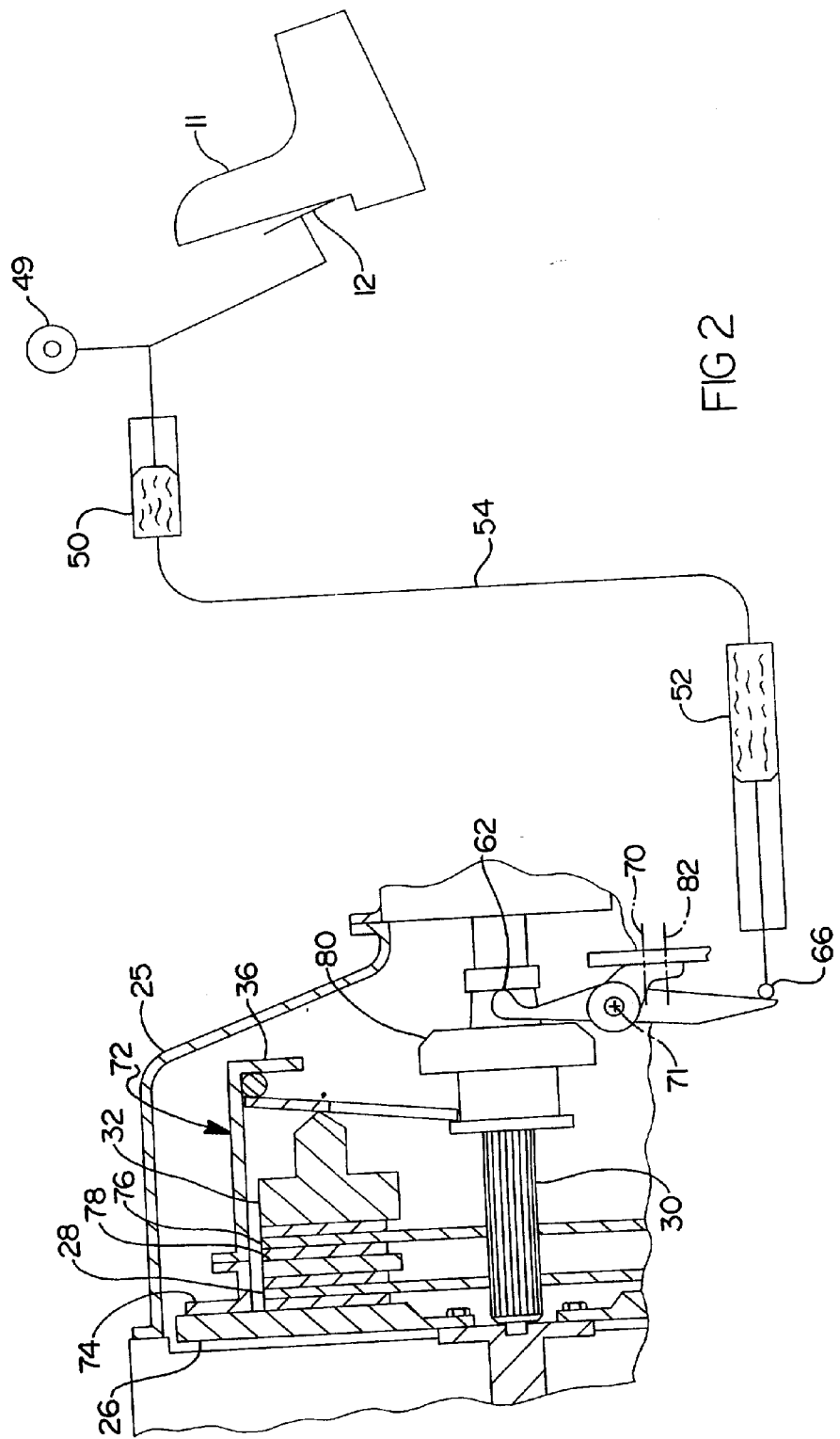
FIG. 2 is a schematic sectional side view of the clutch of FIG. 1 configured for a two disc clutch.
Figure 5:
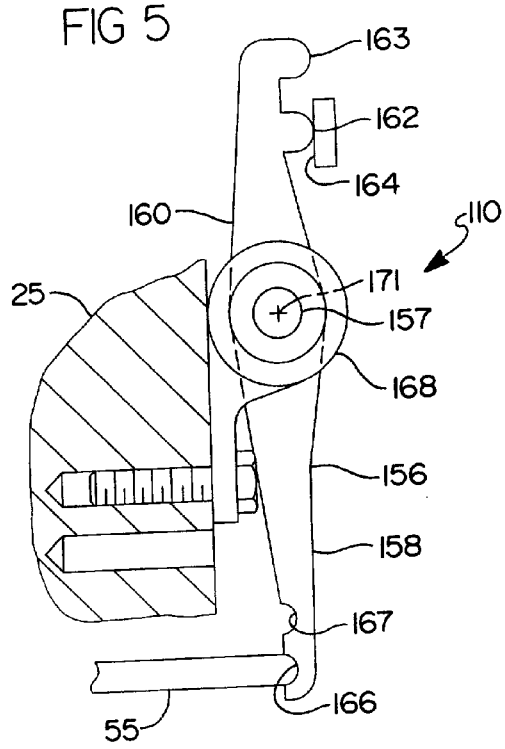
Figure 6:
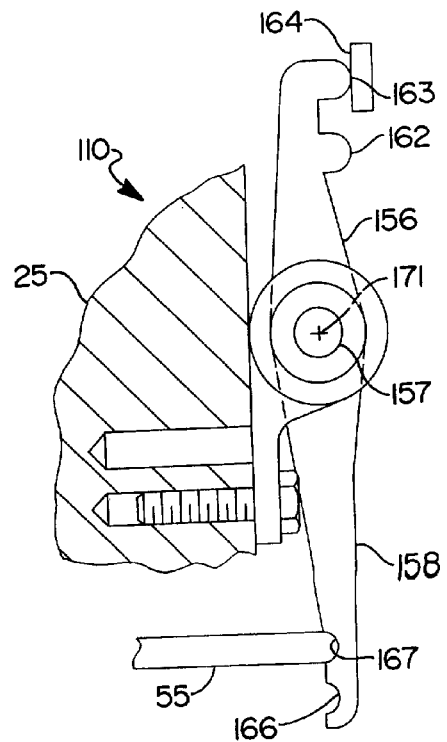
Figure 7:
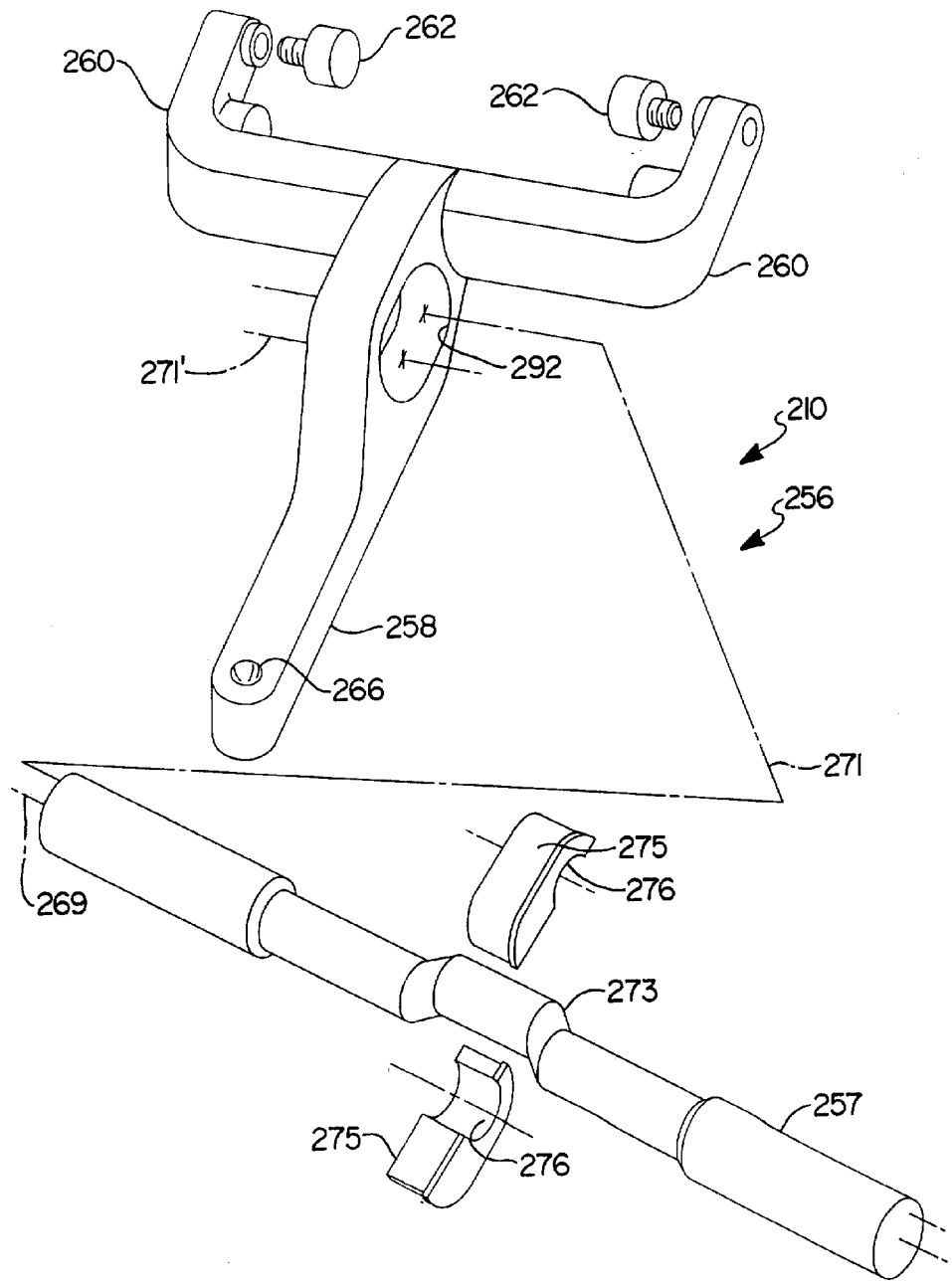
Figure 8:
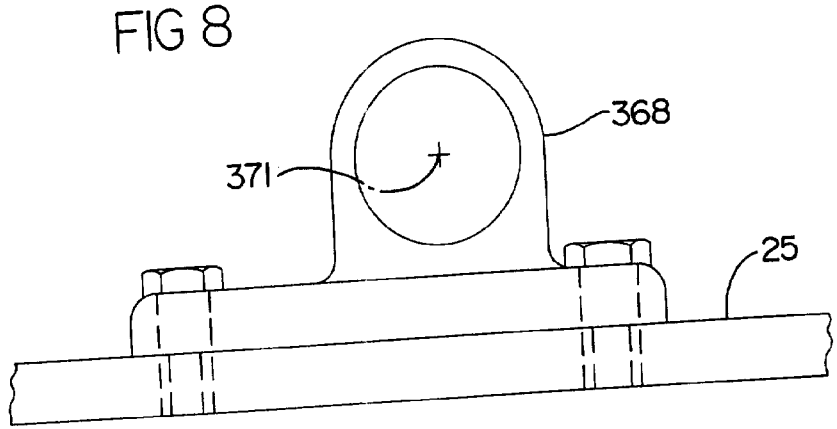
Figure 9:
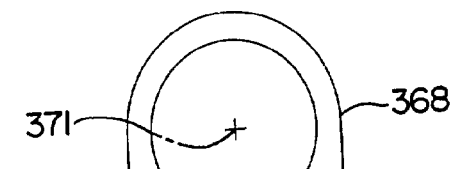

FIG. 2 shows a two disc clutch 72. The clutch is substantially the same as single disc clutch 18, except as described below. A spacer ring 74 is placed between clutch cover 36 and flywheel 26. Spacer ring 74 accommodates the presence of a second driven disc 76 and an intermediate plate 78 disposed between first driven disc 28 and flywheel 26. Second driven disc 76 also has a splined hub portion which slidably engages input shaft 30. Intermediate plate 78, like pressure plate 32 is rotatably fixed to cover 36, yet is able to move in an axial direction relative to cover 36 by means of connecting straps. A shortened release assembly 80 is used in place of release assembly 16. Release assembly 80 allows the axial location of release fork assembly 58 to remain unchanged. Pivot bearings 68 are located at a second shaft support mounting point. The location of the fork pivot axis 71 has been shifted relative to the engagement points 62 and 66 to change the lever ratio. The mechanism by which the axis 71 is shifted relative to the engagement points 62 and 66 by mounting shaft support 68 to clutch housing 25 a second shaft support mount point 82, is described in more detail below in the discussion of FIGS. 3, 4 and 7.

A second linkage distance equals the distance between linkage engagement point 66 and the new location of axis 71. Similarly, a second bearing distance equals the distance between bearing engagement points 62 and the new location of axis 71. A second clutch fork lever ratio equals the second linkage distance divided by the second bearing distance.

An exemplary first lever ratio is 1.71:1 which, for the available travel of push rod 55, provides an exemplary release bearing travel of 0.365 inches (9.3 mm) sufficient release bearing travel to fully disengage single plate clutch 18. A corresponding exemplary second lever ratio and associated release bearing travel for dual plate clutch 72 are 1.25:1 and 0.50 inches (12.5 mm). The ratio and release bearing travel changes are achieved by shifting axis 71 relative to points 62 and 66. Although the fork ratio was changed to accommodate a two plate clutch in FIG. 2, it should be appreciated that the change in fork ratio could also be made to accommodate switching from a non-cushion driven disc to a cushion driven disc.

FIG. 3 shows input shaft 30 in phantom passing through a combination bearing retainer and quill 84, also in phantom. A bearing housing portion 86, of a first length in FIG. 3 for a single disc system is replaced with a shorter version 88 as shown in FIG. 4. An inner sleeve 90 is disposed radially between housings 86 and 88 and quill 84. A ball bearing (not shown) is disposed between housing 86 and inner sleeve 90. A pivot shaft groove 92 in the form of a non-circular aperture passes through fork assembly 56 and receives release shaft 57. A spacer 94 is disposed in groove 92 to keep shaft 57 in the position shown in FIG. 3. Fasteners passing through apertures 96 retain pivot support 68 in a first position by threading into apertures formed in clutch housing 25. The two disc system of FIG. 4 is substantially the same as the single disc system of FIG. 3, except that bearing housing 88 is shorter than bearing housing 86 to compensate for the addition of the second disc 76 and intermediate plate 78. Pivot bearing 68 is mounted at the second shaft support mounting point 82. Spacer 94 has been reversed in groove 92 so as to retain shaft 57 in the second position, and thereby shift the location of axis 71 relative to engagement points 62 and 66.

Figure 5:
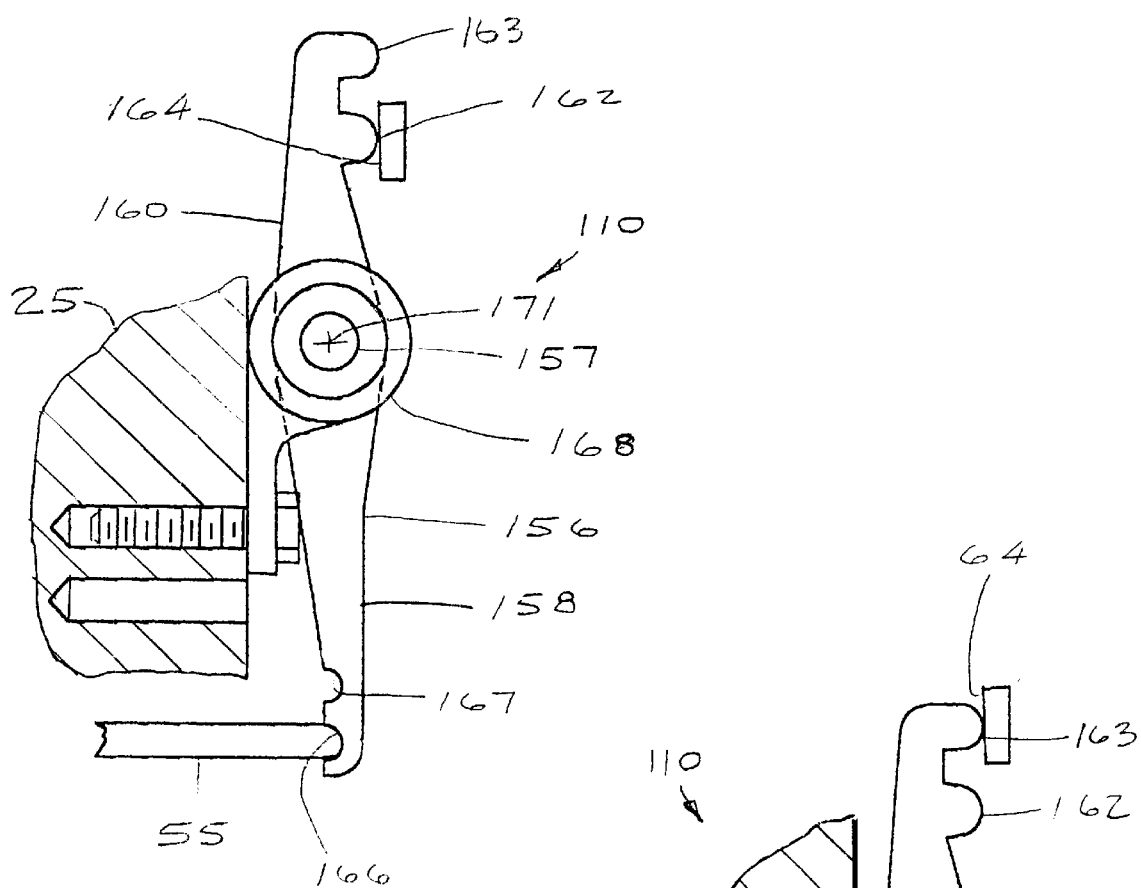
FIG. 5 is a side view detail of a first alternative embodiment of a clutch fork configured for a single disc clutch.
Figure 6:
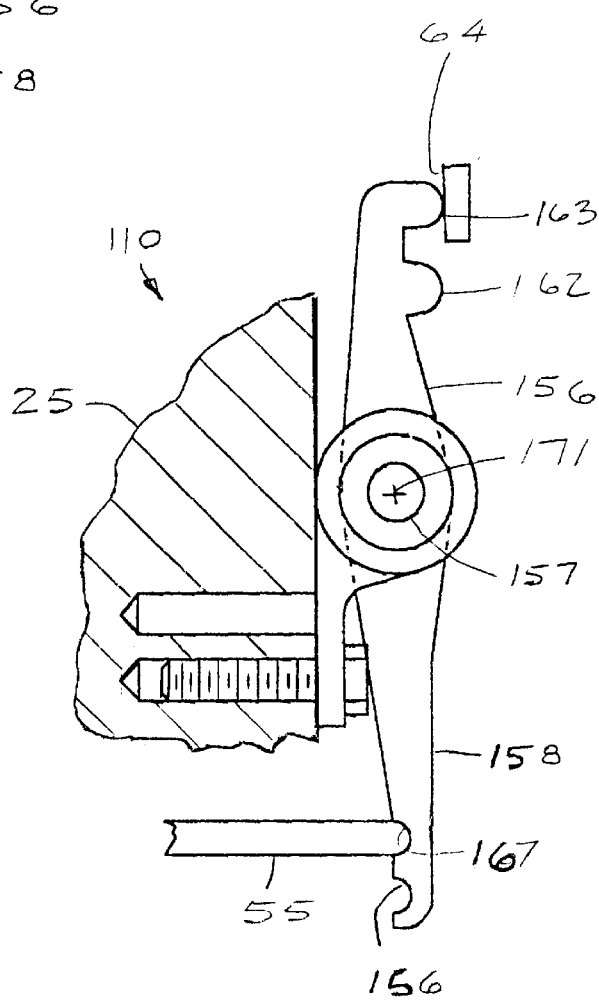
FIG. 6 is a side view detail of the clutch fork of FIG. 5 configured for a two disc clutch.

FIGS. 5 and 6 show a first alternative embodiment of the clutch release mechanism 110. Clutch release mechanism 110 is substantially the same as clutch release mechanism 10 except fork assembly 156 is different. Fork assembly 156 includes a release shaft 157, and a lever arm 158 and tines 160 extending from release shaft 157. Ends of release shaft 157 are each supported by a bearing 168. Bearings 168 can be mounted in either a first position as shown in FIG. 5 or a second, dual disc position as shown in FIG. 6. In the first disc position shown in FIG. 5, the single mode bearing engagement points 162 are located proximate to a distal end of tines 160, but radially inwardly of dual mode bearing engagement point 153. Point 162 engage release assembly pads 64. The lever arm 158 has a single mode push rod engagement point 166 at its extreme end which receives push rod 55. In the two disc configuration, as shown in FIG. 6, it is the dual mode bearing engagement points 163 of tines 160 which engage release assembly pads 64. The dual mode push rod engagement point 167 is spaced from an end of lever arm 1 58 and from the fork pivot axis 171 a predetermined distance. The distance between single mode bearing engagement point 162 and single mode push rod engagement 166 is identical with a distance between a line connecting dual mode bearing engagement points 163 and dual mode push rod engagement point 167. This allows the relative location of both the release assembly pads 64 and the push rod to remain the same for both single disc and dual disc applications.

One benefit of this configuration is that the fork can be fixed to shaft 157, eliminating any potential for lash for relative movement therebetween.

Figure 7:
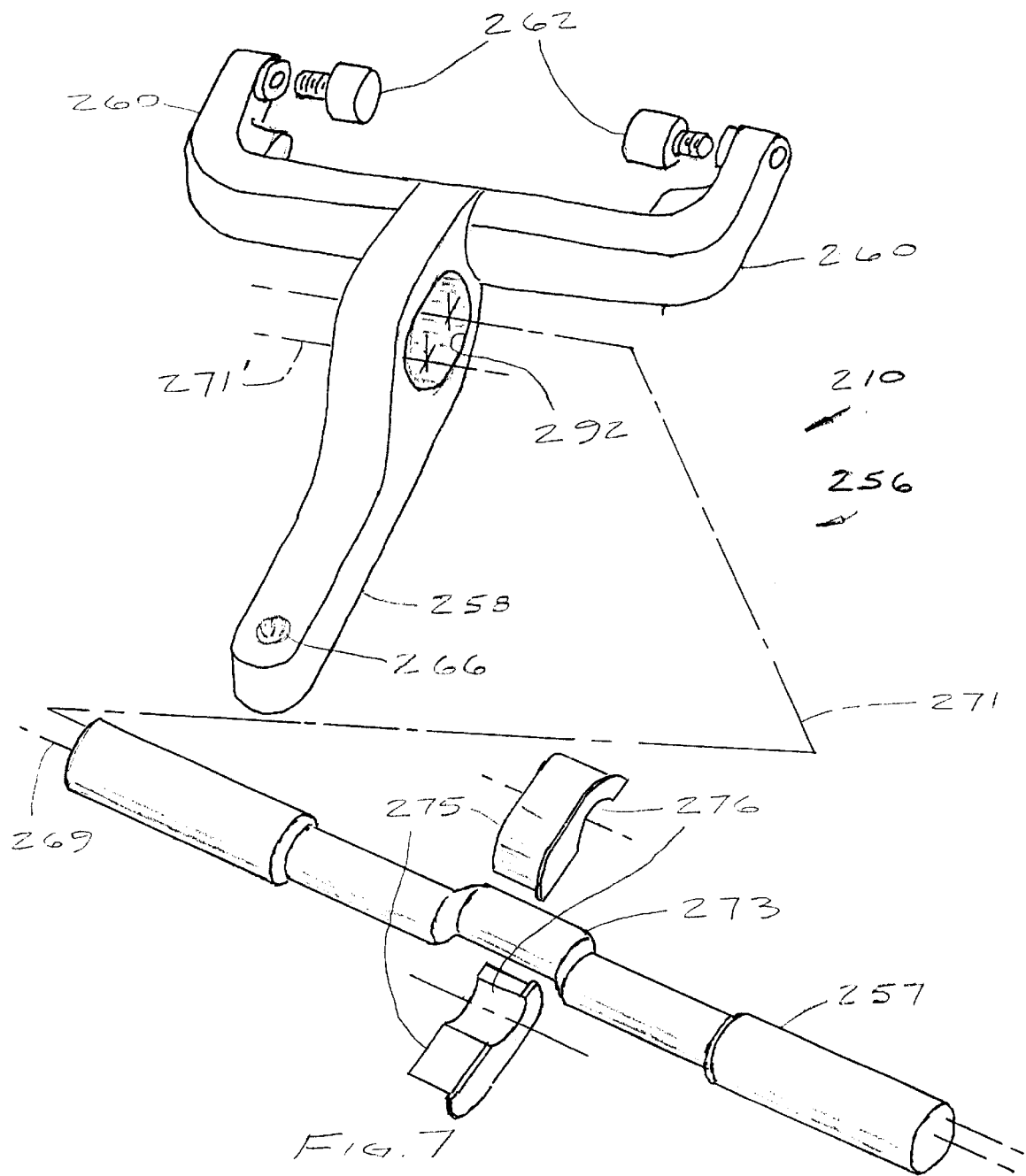
FIG. 7 is a perspective view of a second alternative embodiment of a clutch fork.

A second alternative embodiment, as shown in FIG. 7 includes a clutch release mechanism 210 identical to clutch release mechanisms 10 and 110, except for the use fork assembly 256. Fork assembly 256 includes a release shaft 257. A lever arm 258 extends in a first direction away from an installed shaft 257. A pair of tines 260 extend in a second direction away from release shaft 257. Bearing engagement points 262 in the form of rollers are found proximate to the distal end of tines 260, and are disposed on an inboard side of tines 260 for engagement with release assembly pads 64. A push rod engagement point in the form of a pocket 266 is disposed at a distal end of lever arm 258. A shaft support is disposed at each end of shaft 257, and fixes shaft 257 to clutch housing 25.

Shaft 257 has an off set portion 273 with a fork pivot axis 271. Fork pivot axis 271 is offset from a center line 269 of the ends of shaft 257. Fork pivot axis 271 is centered within an offset portion 273 of shaft 257. Shaft 257 is oriented in one of two ways by rotating shaft 257 1800 about center line 269. The offset portion 273 of shaft 257 is enclosed by a split fork bushing 275 having an offset aperture 276 centered about axis 271. In the dual disc mode shown in FIG. 7, offset portion 273 is disposed in groove 292 with axis 271 being most proximate to tines 260. In the single disc mode, shaft 257 would be rotated 180°, and split fork bushing 275 reversed so that the center of aperture 276 and axis 271 would be shifted to the location of axis 271'.

A benefit of the configuration of FIG. 7 is that only one set of mounting holes would be needed for attaching shaft 257 to housing 25, as its ends would be in the same location independent of the location of axis 271.

Figure 8:
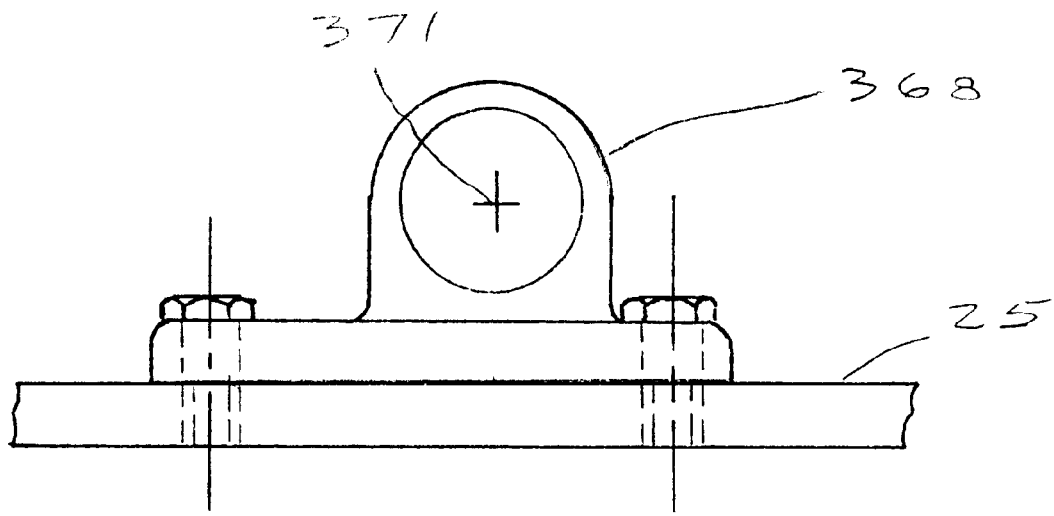
FIG. 8 is a side view of a reversible bearing in a first orientation.
Figure 9:
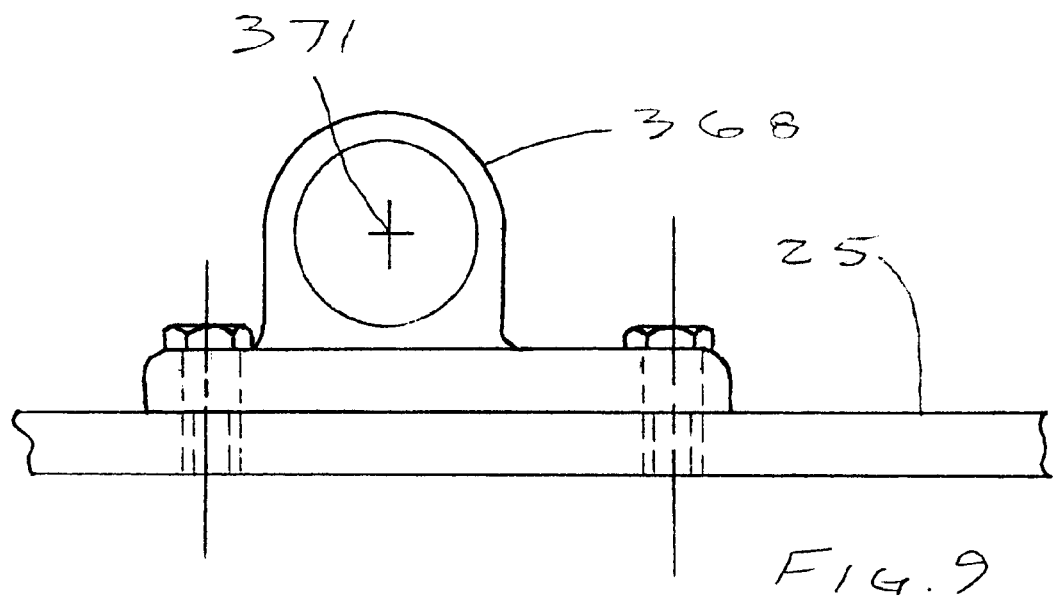
FIG. 9 is a side view of the bearing of FIG. 8 in a second orientation.
Figure 1:
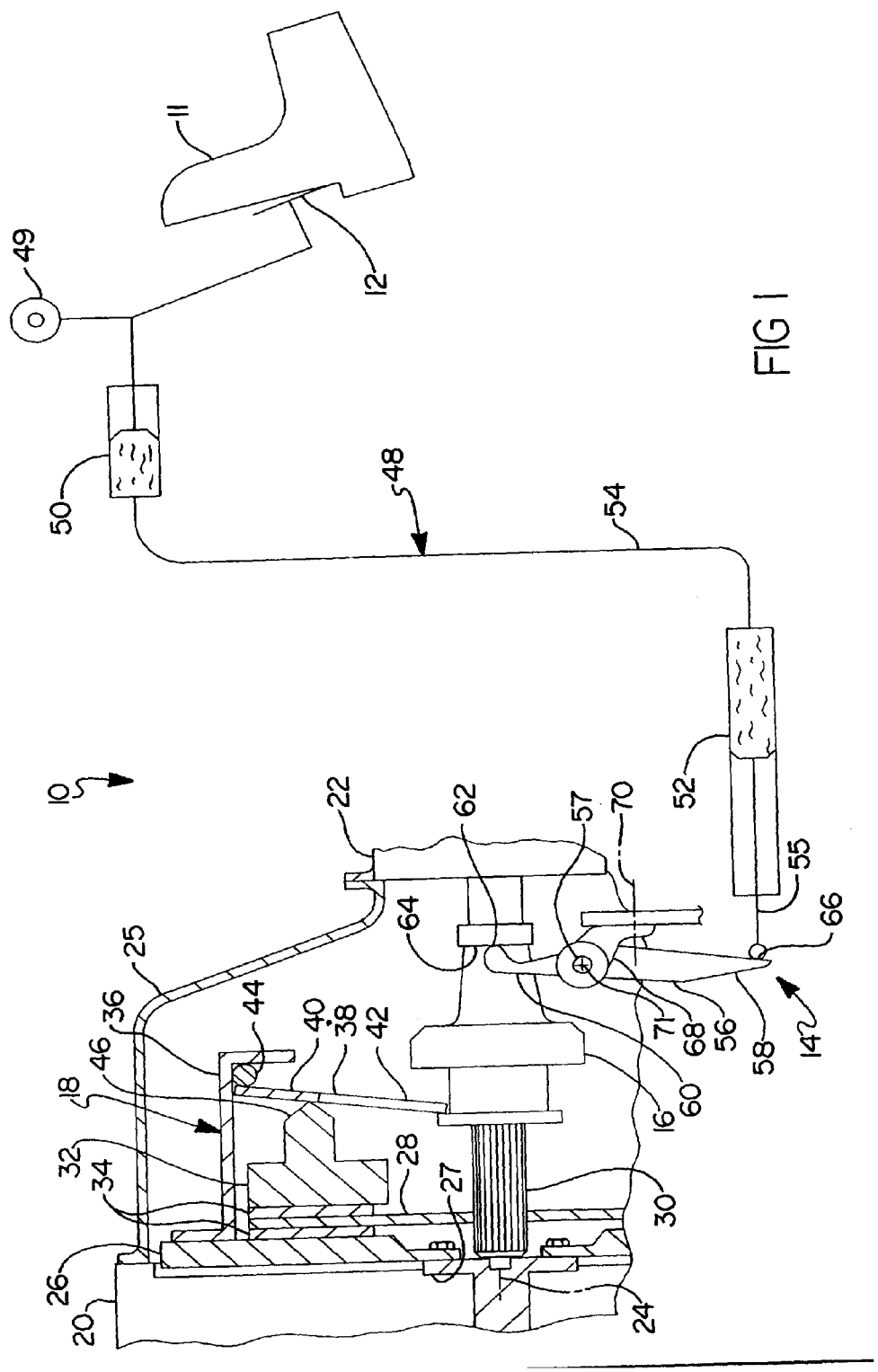

FIG. 8 and FIG. 9 show an alternative means shifting the location of axis 371 relative to clutch housing 25 employing just a single set of threaded mounting holes in housing 25. A reversible bearing 368 is used with fork assembly 52. Mounting apertures 396 of bearing 368 are unequally spaced from axis 371. Bearings 368 are reversed to shift the location of axis 371 relative to clutch housing 25.

As is readily apparent from the above discussion, the location of axis 71, 171, 271, 371 is shifted both relative to engagement points, and to clutch housing 25. Two strategies are disclosed for achieving the desired shifting of the location of the axis of fork rotation 71, 171, 271, 371 relative to the engagement points 62, 66, 162, 163, 167, 167, 262, 266:

1. Moving the axis relative to the engagement points, as shown in FIGS. 1, 2, 3, 4, and 7; and
2. Moving the engagement point relative to the axis, as shown in FIGS. 5 and 6.

Three approaches for shifting axis 71, 171, 271, 371 relative to clutch housing 25 are disclosed:

1. Moving the shaft supports by using a second set of mounting holes, as shown in FIGS. 1, 2, 3, 4, 5, and 6;
2. Providing an offset portion to the shaft as shown in FIG. 7; and
3. Employing reversible shaft supports as shown in FIGS. 8 and 9.

While each of the axis-to-engagement-point-location strategies has been disclosed in the context of a particular axis-to-clutch-housing-location approach, it should be appreciated that any of one can be used with any of the other.

It should be appreciated that there are yet additional readily apparent alternative embodiments to the above described clutch configurations. For example, the lever arm could be disposed outside of the clutch housing. Clutches may employ a plurality of angle springs and levers in place of diaphragm spring 38. Bearing engagement points for forks like those shown in FIG. 7 could be moved by moving the location of rollers 262.

The embodiments disclosed herein have been discussed for the purpose of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims.

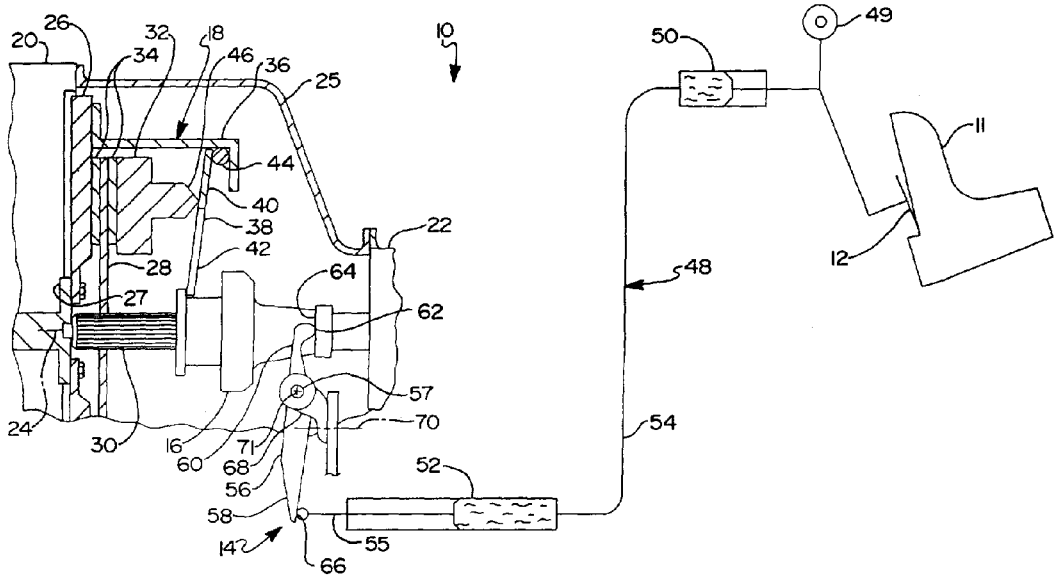

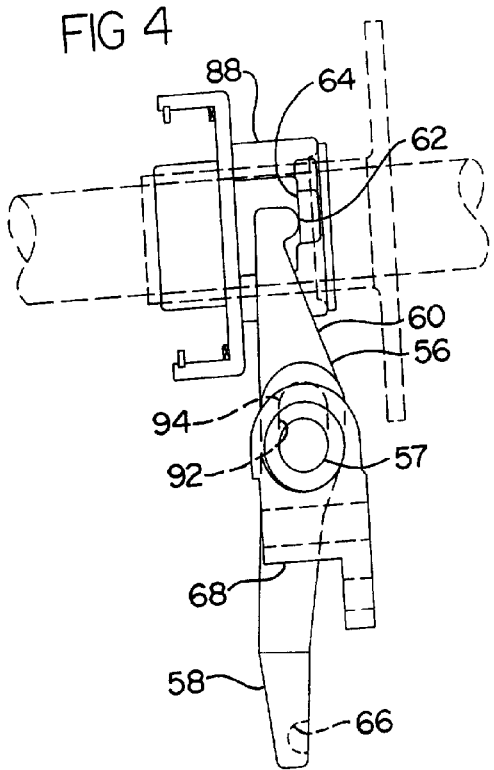
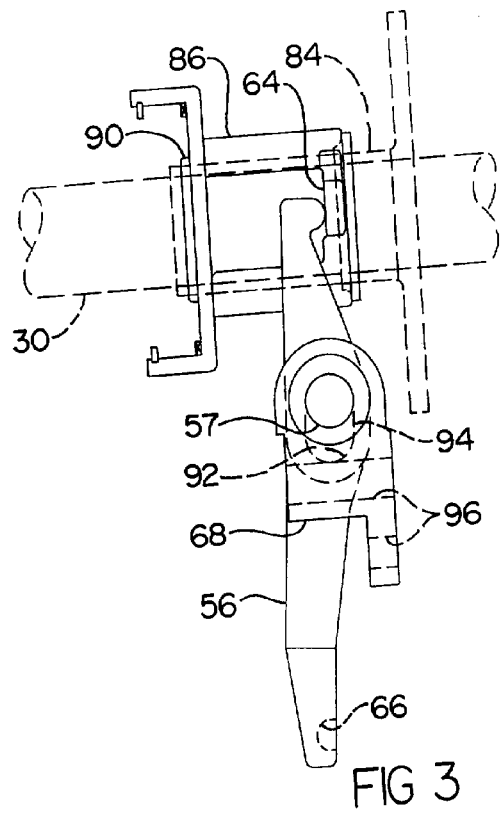

We claim:

1. A clutch fork assembly for use with a motor vehicle clutch comprising:

a shaft having an axis of fork rotation at a first location;
   a fork having a pair of tines and a lever arm;
   the pair of tines extending away from the shaft, each tine having a first bearing engagement point at a first bearing distance from the axis of fork rotation;
   the lever arm extending away from the shaft and having a first linkage engagement point at a first linkage distance from the axis of fork rotation, and the linkage engagement point being a predetermined distance from the bearing engagement points, wherein a first clutch fork lever ratio is established by dividing the first linkage distance by the first bearing distance;
   the fork and the shaft configured so that one of:
      the axis of rotation is selectively movable between the first location and a second location, and
      the tines each have a second bearing engagement point and the lever arm has a second linkage engagement point with the distance between the second linkage engagement point and the second bearing engagement points equaling the predetermined distance,
   and a second linkage distance equals, respective to the fork and shaft configuration, one of:
      a distance between the first linkage engagement point and the axis of rotation in the second location, and
      a distance between the second linkage engagement point and the axis of rotation in the first location, and
   a second bearing distance equals, respective to the fork and shaft configuration, one of:
      a distance between the first bearing engagement point and the axis of rotation in the second location, and
      a distance between the second bearing engagement point and the axis of rotation in the first location
   wherein the ratio of the first linkage distance to the first bearing distance is selected to provide an amount of travel of a release bearing sufficient to achieve complete release of a first clutch disc configuration, and a ratio of the second linkage distance to the second bearing distance is selected to provide an amount of travel of the release bearing sufficient to achieve complete release of a second clutch disc configuration.

2. A clutch fork assembly as claimed in claim 1, wherein the axis of fork rotation is selectively movable between the first location and a second location.

3. A clutch fork assembly as claimed in claim 2, wherein the fork also includes a reversible fork bushing, the fork bushing having an offset aperture therein and the offset aperture centered on the axis of rotation, the fork bushing being disposed in a non-circular aperture in the fork in one of a first position and a second position, with the axis of fork rotation being in the first location when the fork bushing is in the first position and the axis of rotation being in the second location when the fork bushing is in the second position.

4. A clutch fork assembly as acclaimed in claim 1, wherein the tines have a second bearing engagement point and the lever arm has a second linkage engagement point.

5. A clutch fork assembly as claimed in claim 1 wherein:
the shaft has a first side and a second side on opposite sides of the fork,
a shaft support engages each side of the shaft; and
a clutch housing has mounting features to which the shaft supports are attached.

6. A clutch fork assembly as claimed in claim 5, wherein the clutch housing has mounting features providing a plurality of shaft mounting locations.

7. A clutch for motor vehicle comprising:
a cover having an axis of rotation;
a pressure plate coupled to the cover for rotation therewith about the axis;
a pressure plate biasing spring interposed between the cover and the pressure plate biasing the pressure plate toward an engaged pressure plate position;
a release assembly engaging the biasing spring; and
a clutch fork assembly engaging the release bearing including:
a clutch fork shaft having an axis of fork rotation at a first location
a fork having a pair of tines and a lever arm;
the pair of tines extending away from the shaft, each tine having a first bearing engagement point at a first bearing distance from the axis of fork rotation;
the lever arm extending away from the shaft and having a first linkage engagement point at a first linkage distance from the axis of fork rotation, and the linkage engagement point being a predetermined distance from the bearing engagement points, wherein a first clutch fork lever ratio is established by dividing the first linkage distance by the first bearing distance;
the fork and the shaft configured so that one of:
the axis of rotation is selectively movable between the first location and a second location, and the tines each have a second bearing engagement point and the lever arm has a second linkage engagement point with the distance between the second linkage engagement points and the second bearing engagement point equaling the predetermined distance, and a second linkage distance equals, respectively, one of:
a distance between the first linkage engagement point and the axis of rotation in the second location, and
a distance between the second linkage engagement point and the axis of rotation in the first location, and
a second bearing distance equals, respectively, one of:
a distance between the first bearing engagement point and the axis of rotation in the second location, and
a distance between the second bearing engagement point and the axis of rotation in the first location wherein the ratio of the first linkage distance to the first bearing distance is selected to provide an amount of travel of a release bearing sufficient to achieve complete release of a first clutch disc configuration, and a ratio of the second linkage distance to the second bearing distance is selected to provide an amount of travel of the release bearing sufficient to achieve complete release of a second clutch disc configuration.

8. A clutch as claimed in claim 7, wherein the axis of fork rotation is selectively movable between the first location and a second location.

9. A clutch as claimed in claim 8, wherein the fork also includes a reversible fork bushing, the fork bushing having an offset aperture therein and the offset aperture centered on the axis of rotation, the fork bushing being disposed in a non-circular aperture in the fork in one of a first position and a second position, with the axis of fork rotation being in the first location when the fork bushing is in the first position and the axis of rotation being in the second location when the fork bushing is in the second position.

10. A clutch as claimed in claim 8 wherein:
the shaft has a first side and a second side on opposite sides of the fork,
a shaft support engages each side of the shaft; and
a clutch housing has mounting features to which the shaft supports are attached.

11. A clutch as claimed in claim 10, wherein the clutch housing has mounting features providing a plurality of shaft mounting locations.

12. A clutch as acclaimed in claim 7, wherein the tines have a second bearing engagement point and the lever arm has a second linkage engagement point.

13. A clutch fork assembly for use with a motor vehicle clutch comprising:
a shaft having an axis of fork rotation at a first location
a fork having a pair of tines and a lever arm;
the pair of tines extending away from the shaft, each tine having a first bearing engagement point at a first bearing distance from the axis of fork rotation;
the lever arm extending away from the shaft and having a first linkage engagement point at a first linkage distance from the axis of fork rotation, and the linkage engagement point being a predetermined distance from the bearing engagement points, wherein a first clutch fork lever ratio is established by dividing the first linkage distance by the first bearing distance; and
means for shifting one of the axis of rotation and the engagement points relative to each other between the first distances and second distances, wherein the distance between the engagement points and the axis of rotation may be set based on whether the clutch will be employing a first clutch disc configuration or a second clutch disc configuration.

14. A clutch fork assembly as claimed in claim 13, wherein the axis of fork rotation is selectively movable relative to the engagement points from a first location to a second location.

15. A clutch fork assembly as claimed in claim 14, wherein the fork also includes a reversible fork bushing, the fork bushing having an offset aperture therein and the offset aperture centered on the axis of rotation, the fork bushing being disposed in a non-circular aperture in the fork in one of a first position and a second position, with the axis of fork rotation being in the first location when the fork bushing is in the first position and the axis of rotation being in the second location when the fork bushing is in the second position.

16. A clutch fork assembly as acclaimed in claim 13, wherein the tines have a second bearing engagement point and the lever arm has a second linkage engagement point.

17. A clutch fork assembly as claimed in claim 13 wherein:
the shaft has a first side and a second side on opposite sides of the fork,
a shaft support engages each side of the shaft; and
a clutch housing has mounting features to which the shaft supports are attached.

18. A clutch fork assembly as claimed in claim 17, wherein the clutch housing has mounting features providing a plurality of shaft mounting locations.

* * * * *

UNITED STATES PATENT AND TRADEMARK OFFICE
CERTIFICATE OF CORRECTION

PATENT NO. : 6,311,818 B1
DATED : November 6, 2001
INVENTOR(S) : Cole et al.

It is certified that error appears in the above-identified patent and that said Letters Patent is hereby corrected as shown below:

<u>Title page,</u>
The Title page, showing an illustrative figure, should be deleted and substituted therefor the attached title page.

<u>Drawings,</u>
Delete drawing sheets 1-6, and substitute therefor the drawing sheets consisting of Figs. 1-9, as shown on the attached pages.

Signed and Sealed this

Eighteenth Day of June, 2002

Attest:

JAMES E. ROGAN
Attesting Officer     Director of the United States Patent and Trademark Office

(12) United States Patent
Cole et al.

(10) Patent No.: US 6,311,818 B1
(45) Date of Patent: Nov. 6, 2001

(54) DUAL POSITION CLUTCH RELEASE FORK

(75) Inventors: Christopher D. Cole, Ft. Wayne; Daniel V. Gochenour, Auburn, both of IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/578,022

(22) Filed: May 24, 2000

(51) Int. Cl.[7] .................................................... F16D 13/75
(52) U.S. Cl. ..................... 192/99S; 74/522; 192/110 R
(58) Field of Search .......................... 192/99S, 110 R, 192/98, 85 C, 91 R, 70.13, 70.25, 89.22, 89.24, 70.29, 70.3; 74/522, 519

(56) References Cited

U.S. PATENT DOCUMENTS

| | | |
|---|---|---|
| 3,800,929 * | 4/1974 | Morris ................................. 192/99 S |
| 3,841,449 * | 10/1974 | Coffey et al. .......................... 192/91 R |
| 4,644,812 * | 2/1987 | Nelson ................................. 74/522 X |

* cited by examiner

Primary Examiner—Rodney H. Bonck
(74) Attorney, Agent, or Firm—Kevin M. Hinman

(57) ABSTRACT

A clutch fork assembly for use with a motor vehicle clutch includes a shaft and a fork. The shaft has an axis of fork rotation at a first location. The fork has a pair of tines and a lever arm. Each tine has a first bearing engagement point at a first bearing distance from the axis of fork rotation. The lever arm has a first linkage engagement point at a first linkage distance from the axis of fork rotation. The link engagement point is a predetermined distance from the bearing engagement point. A first clutch fork lever ratio is established by dividing the first linkage distance by the first bearing distance. The fork and shaft are configured so that, alternatively, one of the axis of rotation is selectively moveable between the first location and a second location, or the tines each have a second bearing engagement point and the lever arm has a second linkage engagement point with the distance between the second linkage engagement point and the second bearing engagement point equaling the predetermined distance.

18 Claims, 6 Drawing Sheets